US006925086B2

(12) United States Patent
Curtis et al.

(10) Patent No.: US 6,925,086 B2
(45) Date of Patent: Aug. 2, 2005

(54) PACKET MEMORY SYSTEM

(75) Inventors: Michael William Curtis, Rochester, MN (US); Adalberto Guillermo Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 09/735,410

(22) Filed: Dec. 12, 2000

(65) Prior Publication Data

US 2002/0071441 A1 Jun. 13, 2002

(51) Int. Cl.⁷ .......................... H04L 12/56; G06F 13/28
(52) U.S. Cl. ................... 370/395.7; 370/412; 370/428; 710/308; 711/105; 711/154
(58) Field of Search .................... 370/362, 378–383, 370/395.7, 395.72, 412, 428; 710/305, 308; 711/100, 105, 154

(56) References Cited

U.S. PATENT DOCUMENTS

| | | | | | |
|---|---|---|---|---|---|
| 5,508,970 | A | * | 4/1996 | Toda ........................... | 365/240 |
| 6,032,220 | A | * | 2/2000 | Martin et al. .................. | 711/5 |
| 6,085,283 | A | * | 7/2000 | Toda ........................... | 711/104 |
| 6,182,184 | B1 | * | 1/2001 | Farmwald et al. .......... | 710/305 |
| 6,286,075 | B1 | * | 9/2001 | Stracovsky et al. ............ | 711/5 |
| 6,370,627 | B1 | * | 4/2002 | Manning ..................... | 711/154 |
| 6,442,644 | B1 | * | 8/2002 | Gustavson et al. .......... | 711/105 |
| 2002/0010831 | A1 | * | 1/2002 | DeMone et al. ............. | 711/105 |
| 2002/0133665 | A1 | * | 9/2002 | Mailloux et al. ........... | 711/105 |
| 2003/0126353 | A1 | * | 7/2003 | Satoh et al. ................ | 711/100 |

* cited by examiner

Primary Examiner—Hassan Kizou
Assistant Examiner—Gregory B Sefcheck
(74) Attorney, Agent, or Firm—Joan Pennington

(57) ABSTRACT

A packet memory system is provided. The packet memory system includes a memory cell array for storing a predefined number of packets. Each packet includes a predetermined number of segments. Each of the segments defines a starting point of a memory access. A packet decoder coupled to the memory cell array receives packet select inputs for selecting a packet. A segment decoder coupled to the memory cell array receives segment select inputs for selecting a segment. A data flow multiplexer is coupled to the memory cell array for transferring data between a data bus and the memory cell array. Command and mode registers receive command, read/write (R/W) and chip select (CS) inputs for opening a packet. Responsive to an opened packet, the packet select inputs provide a length for the memory access. Each of the segments has a preprogrammed length. Also each of the segments can be defined for a cache line.

17 Claims, 8 Drawing Sheets

PACKET 300

| A<br>VARIANT<br>HEADER 302 | B<br>INVARIANT<br>HEADER 304 | C<br>PAYLOAD 306 | D<br>VARIANT<br>CRC 308 |
|---|---|---|---|

FIG. 3

ROUTER OR SWITCH DATA FLOW

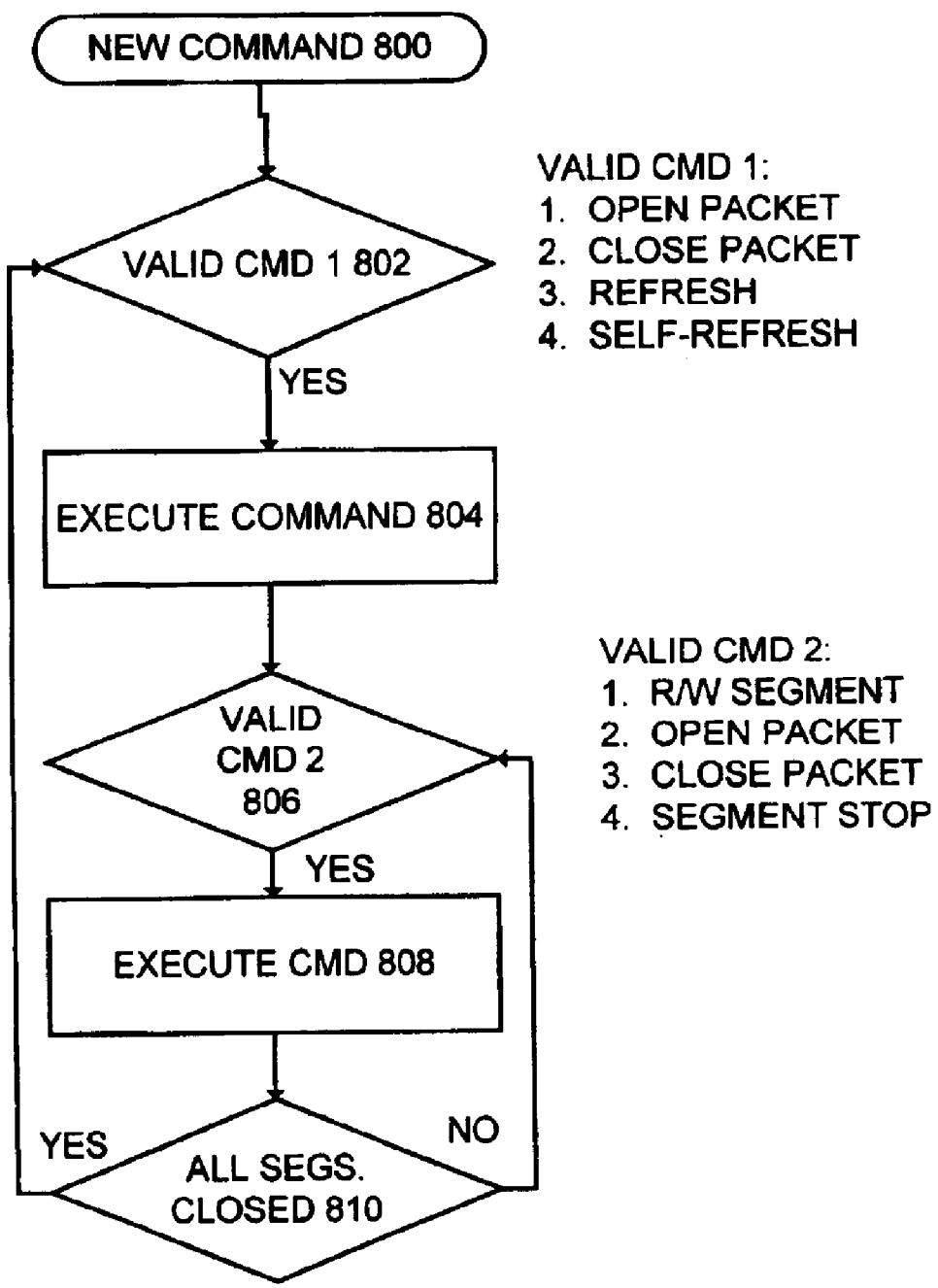

PACKET MEMORY SYSTEM

FIELD OF THE INVENTION

The present invention relates generally to the data processing field, and more particularly, relates to an improved packet memory system.

DESCRIPTION OF THE RELATED ART

In a memory system it is desirable to minimize memory latency and to provide improved efficient performance. Memory latencies are of great concern in various network situations and various memory arrangements. Infiniband (IB) is no exception. Infiniband™ Trade Association is developing a new common I/O specification to deliver a channel based, switched fabric technology that the entire industry can adopt. Infiniband™ Architecture represents a new approach to I/O technology and is based on the collective research, knowledge, and experience of multiple computing industry's leaders.

Memory latencies are a concern because in networking situations, packets are stored in conventional memory arrangements. With conventional memory, every word of data is accessible and that requires time to find the correct data and time to move the data from cell to driver. There are two main causes of this latency. The first cause of this latency results from address decoding and the second cause of this latency results from the time though the sense amplifier.

It is desirable to provide an improved memory system having a mechanism for solving these two main causes of memory latency. It is desirable to provide an improved memory system that reduces the latency from data request to data availability.

A need exists for a memory system having minimized memory latency and improved efficient performance.

SUMMARY OF THE INVENTION

A principal object of the present invention is to provide an improved memory system. Other important objects of the present invention are to provide such improved memory system substantially without negative effect and that overcome many of the disadvantages of prior art arrangements.

In brief, a packet memory system is provided. The packet memory system includes a memory cell array for storing a predefined number of packets. Each packet includes a predetermined number of segments. Each of the segments defines a starting point of a memory access. A packet decoder coupled to the memory cell array receives packet select inputs for selecting a packet. A segment decoder coupled to the memory cell array receives segment select inputs for selecting a segment. A data flow multiplexer is coupled to the memory cell array for transferring data between a data bus and the memory cell array. Command and mode registers receive command, read/write (R/W) and chip select (CS) inputs for opening a packet. Responsive to an opened packet, the packet select inputs provide a length for the memory access.

In accordance with features of the invention, each of the segments has a preprogrammed length. Also each of the segments can be defined for a cache line.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 is a diagram illustrating an exemplary packet in accordance with the preferred embodiment;

FIGS. 7 and 8 are flow charts illustrating exemplary sequential steps of the packet memory system of FIG. 1.

DETAILED DESCRIPTION OF THE PREFERRED EMBODIMENTS

Figure 1:
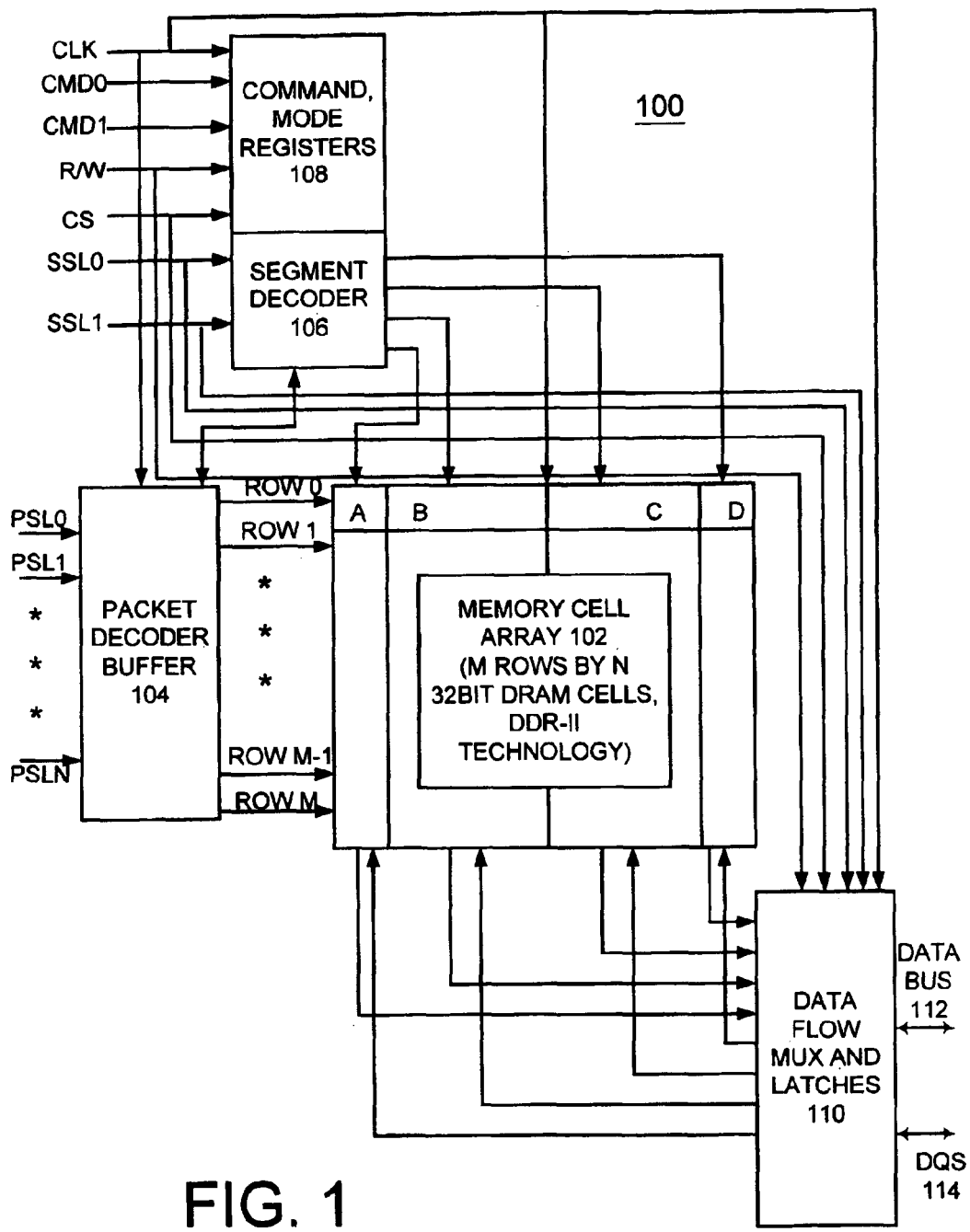
FIG. 1 is a block diagram illustrating a packet memory system in accordance with the preferred embodiment.

In accordance with features of the preferred embodiment, a packet based memory system 100 is provided where a conventional memory column is changed from a random access mode to a mode where data starts at a specific point. The data then fills an allocated segment. The two main causes of latency in conventional memory, address decoding and the time though the sense amplifier, are significantly minimized in the packet based memory system 100. Packet memory system 100 allows a data latency of 1 cycle or less with proper external loading.

Having reference now to the drawings, there is shown a packet memory system in accordance with the preferred embodiment generally designated by the reference character 100. Packet memory system 100 includes a memory cell array 102 having, for example, M rows by N 32 bit dynamic random access memory (DRAM) cells, such as DDR-II technology. A packet decoder buffer 104 receiving packet select lines PSL0–PSLN provides decoded row outputs ROW 0–ROW M to the memory cell array 102. A segment decoder 106 coupled to the packet decoder buffer 104 and receives inputs, segment select lines SSL0, SSL1 and command, mode registers 108 receive inputs clock (CLK), command 0, (CMD0), command 1 (CMD1), read/write R/W and chip select (CS). A data flow multiplexer (MUX) and latches 110 coupled to the memory cell array 102 receives inputs, segment select lines SSL0, SSL1, R/W, and CS. The packet decoder buffer 104 functions as a row decoder in a conventional memory device for selecting a particular one of rows 0-M. The segment decoder 106 is a small column decoder for selecting segments A, B, C, and D.

Memory cell array 102 allows a device to read or write one cell after another and allows it to stop a burst at any point along the way. Memory cell array 102 can include cells that have a predefined width, for example, q bits wide and have a predefined number r number of segments with the M packets by N cells. A data bus 112 can include a 32 bit wide data bus specified to run at 400 MB/second/pin multi-drop or 600 MB/second/pin point to point. Data bus 112 coupled to data flow mux 110 can sustain a burst of, for example, 2.4 GB/second sustained data rate. A DQS input 114 to data flow mux 110 is source synchronous with data.

Figure 2:
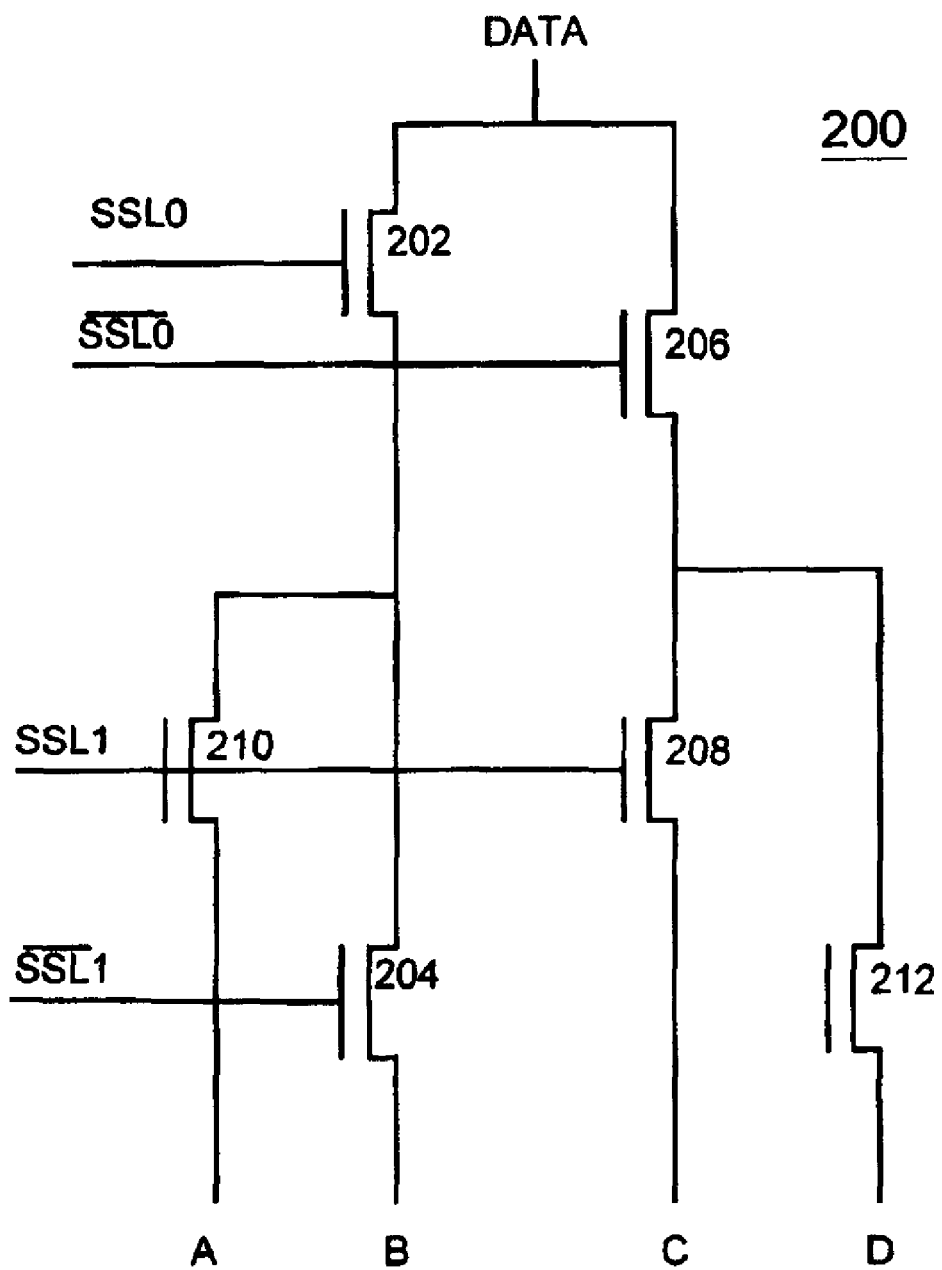
FIG. 2 is a schematic diagram representation illustrating an address decode tree in accordance with the preferred embodiment.

An exemplary segment decoder 200 is illustrated and described with respect to FIG. 2. The CMD0, CMD1, R/W and CS inputs are similar to inputs used in conventional synchronous memory devices. A difference is that after a packet is opened, a read/write R/W is issued and on the packet select lines (PSLs), the length of the data burst is inputted. This accommodates the fact that not all packets fill the payload field. The data flow mux and associated latches 110 are similar to current data flow mux and associated latches of DDR SDRAMs.

Referring to FIG. 2, there is shown an address decode tree of the preferred embodiment generally designated by the reference character 200. As shown in FIG. 2, address decode tree 200 includes a plurality of N-channel field effect transistors (NFETs) 202, 204, 206, 208, 210, and 212, arranged as shown. NFETs 202 and 204 are connected in series between a data input and output B. NFETs 206 and 208 are connected in series between the data input and output C. NFET 210 is connected between the junction connection of NFETs 202 and 204 and output A. NFET 212 is connected between the junction connection of NFETs 206 and 208 and output D. A segment select line input SSL0 is applied to the gate of NFET 202. The complementary segment select input SSL0 is applied to the gate of NFET 206. Segment select input SSL1 is applied to the gate of both NFETs 208 and 210. The complementary segment select input SSL2 is applied to the gate of both NFETs 204 and 212.

The use of starting points and segments of the preferred embodiment decreases the segment decoder 106, for example, as shown in address decode tree 200 in FIG. 2. For comparison, consider the same tree structure with 9 to 13 inputs and $2^9$ to $2^{13}$ outputs for conventional memory columns.

Referring also to FIG. 3, a data packet generally designated by the reference character 300 is broken into four parts, A, B, C, and D. Each of the four segments, A, B, C, and D has a preprogrammed length, for example, 0 to 5 KB. These values are chosen to facilitate use in an IB environment. Also the four segments, A, B, C, and D are given that A+B+C+D cannot be greater than 5 KB. As shown, segment A is used for a variant part of the header, segment B is the invariant part of the header, segment C is the payload and segment D holds the variant cycle redundancy check (CRC) of the packet 300.

It should be understood that the segments could be arranged differently for various communication protocols.

In the memory system 100, the first part of the memory system latency involving address decoding is significantly reduced by reducing the number of address lines. The second part of the memory system latency involving sense amp delay is addressed by the data flow mux 110. The first word of a segment is valid at the mux 110 any time that segment is not being accessed. This means that at the inputs of the mux 110 are four buses that each have valid data on them when there is a packet open. After a packet has been opened, the segment select lines (SSLs) and command lines are active and the chip select (CS) is asserted, a command is decoded on the leading edge of the clock. The SSLs are selected to point at the desired segment, thus allowing data to flow through the mux 110. In packet memory system 100, the delay associated with the mux 110 replaces the delay associated with the sense amp of the conventional memory devices.

Figure 4:
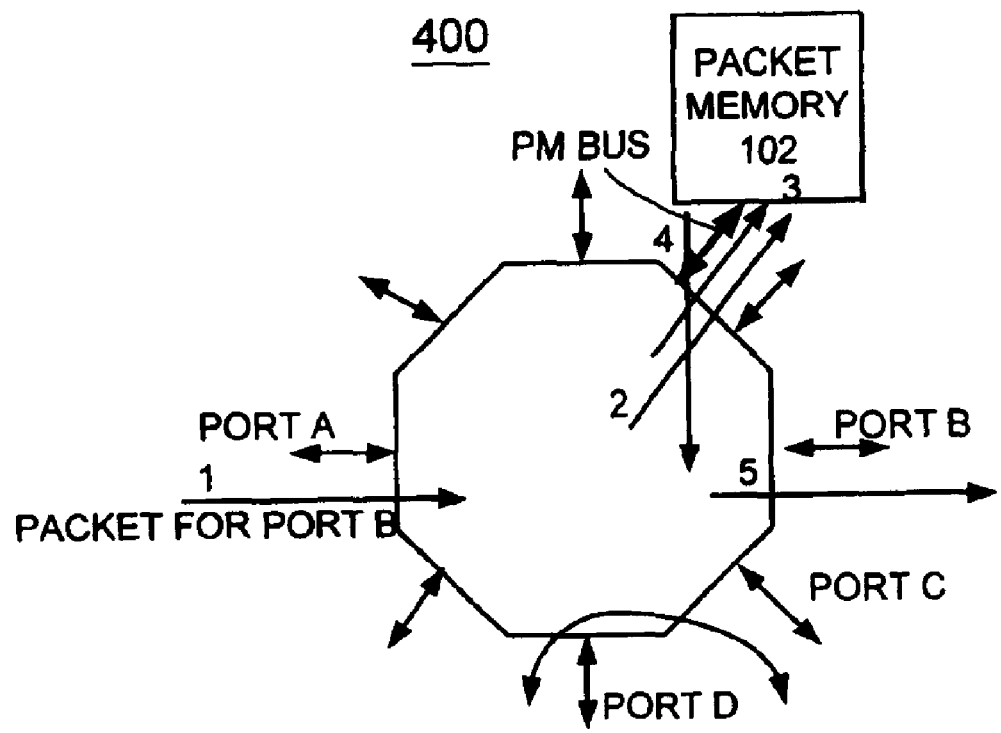
FIG. 4 is a diagram illustrating an exemplary router or switch data flow in accordance with the preferred embodiment.

Referring to FIG. 4, there is shown a router or switch data flow in accordance with the preferred embodiment generally designated by the reference character 400. Switch data flow 400 includes a plurality of ports, PORT A, PORT B, PORT C and PORT D, as shown. A packet memory 102 and packet memory bus PM BUS is coupled to the switch data flow 400. A packet for PORT B indicated at a line labeled 1 enters at PORT A. The packet for PORT B is applied to the packet memory 102 indicated at a line labeled 2 and by the label 3 within the packet memory 102. The packet for PORT B is applied to the PORT B as indicated at lines labeled 4 and 5.

Figure 5:
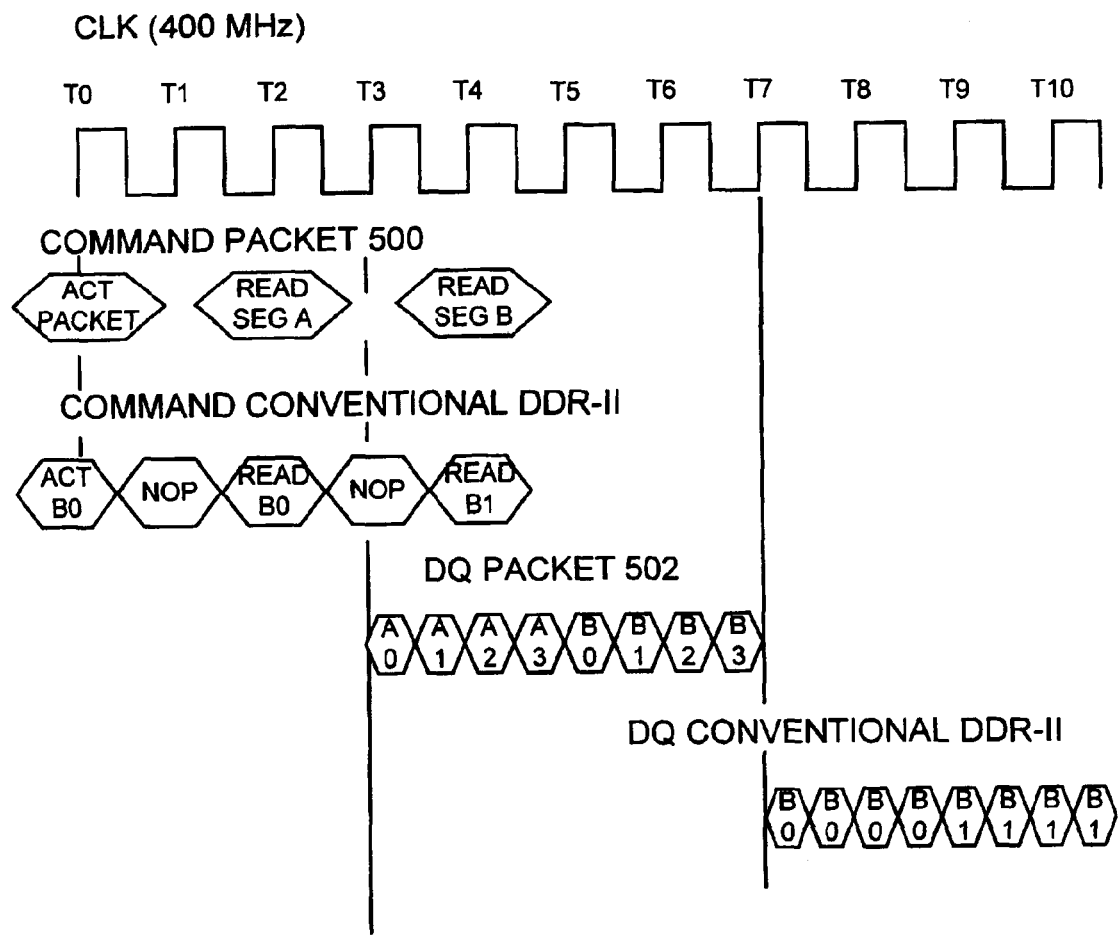
FIG. 5 is a timing diagram illustrating operation of the packet memory system of FIG. 1 as compared to operation of a conventional DDR II system.

Referring to FIG. 5, there is shown a timing diagram illustrating operation of the packet memory system 100 of the preferred embodiment as compared to operation of a conventional DDR II system. The timing diagram includes a clock signal CLK (400 MHz) at the top of the timing diagram. Next a command packet 500 is shown for the packet memory system 100. A command conventional DDR-II is shown under the command packet 500. Next a DQ packet 502 of the packet memory system 100 is shown. Next a DQ conventional DDR II is shown. In the conventional DDR II system, it is at least 12.5 nsec. before data starts. In packet memory system 100 of the preferred embodiment, data starts in 2.5 nsec.

Figure 6:
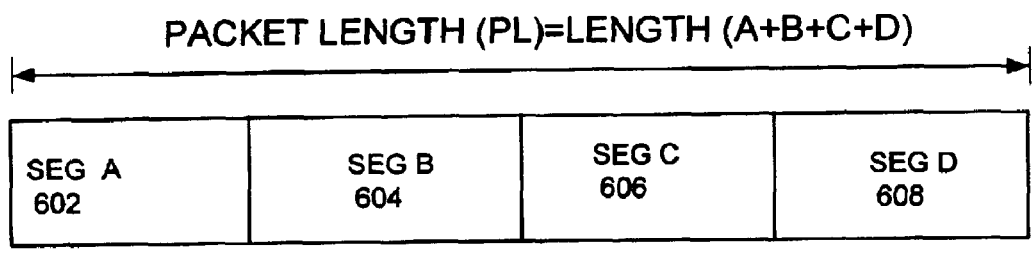
FIG. 6 is a diagram illustrating an exemplary cache line packet arrangement in accordance with the preferred embodiment.

Referring to FIG. 6, a cache line packet generally designated by the reference character 600 is broken into four segments A, B, C, and D; 602, 604, 606 and 608. Each of the four segments, A, B, C, and D has a length, for example, 0 to 5 KB. Also each of the four segments A, B, C, and D; 602, 604, 606 and 608 have an equal length. As shown, a packet length (PL) equals length (A+B+C+D). In this arrangement of packet 600, each segment is a cache line. A cache based processor can pull in a cache line by selecting an appropriate segment. The start of the cache line would be on the bus in 2.5 nsec.

Figure 7:
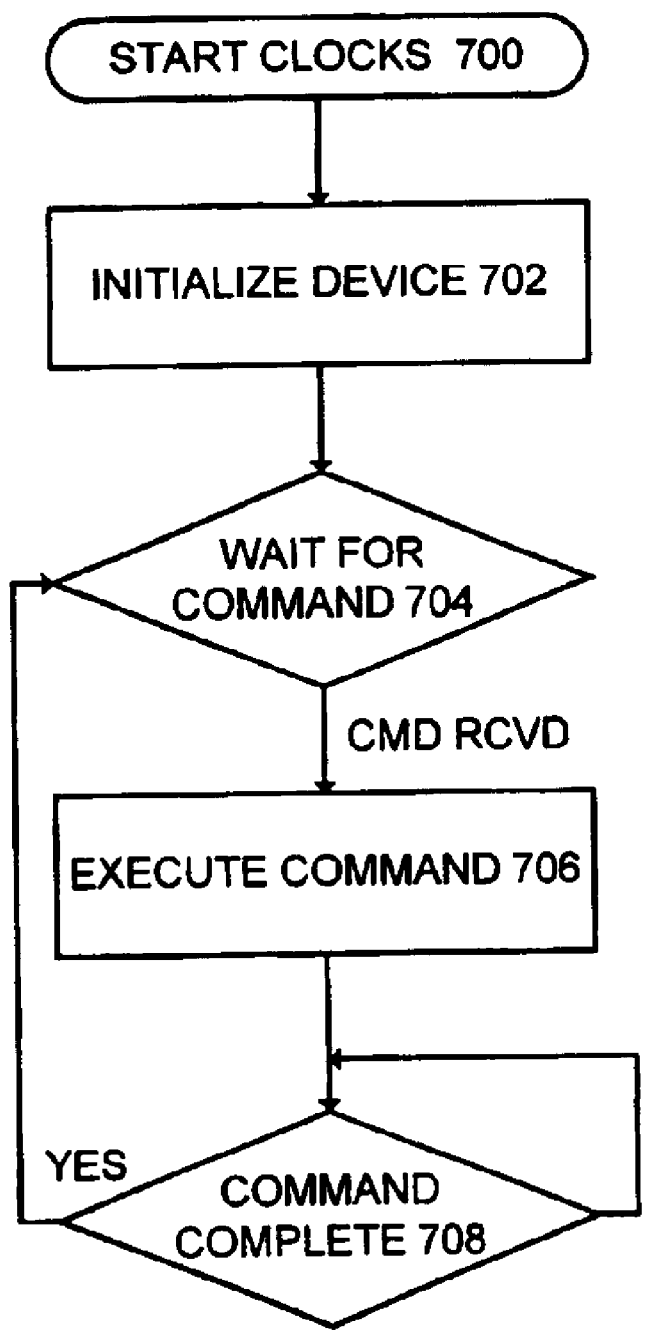

FIGS. 7 and 8 are flow charts illustrating exemplary sequential steps of the packet memory system 100. Referring to FIG. 7, sequential steps of the basic operation of packet memory system 100 are shown. The sequential steps begin when the clocks start as indicated in a block 700. Next device initialization is performed as indicated in a block 702. Waiting for a command is performed as indicated in a decision block 704. When a command is received, then the command is executed as indicated in a block 706. Checking for the command to complete is performed as indicated in a decision block 708. Then the sequential steps return to decision block 704 to wait for a command.

Referring to FIG. 8, sequential steps of a command flowchart in the packet memory system 100 are shown. The sequential steps begin when a new command is identified as indicated in a block 800. Checking for a valid command 1 is performed as indicated in a decision block 802. The valid command 1 includes 1. open packet; 2. close packet; 3. refresh; and 4. self-refresh. When a valid command 1 is identified, then the command is executed as indicated in a block 804. Next checking for a valid command 2 is performed as indicated in a decision block 806. The valid command 2 includes 1. read/write (RAN) segment; 2. open packet; 3. close packet; and 4. segment stop. When a valid command 2 is identified, then the command is executed as indicated in a block 808. In packet memory system 100, only one packet is open at a time within each bank of memory. Next checking for all segments closed is performed as indicated in a decision block 810. When all segments are not closed, then the sequential steps return to decision block 806 to check for a valid command 2. Otherwise when all segments are closed, then the sequential steps return to decision block 802 to check for a valid command 1.

While the present invention has been described with reference to the details of the embodiments of the invention shown in the drawing, these details are not intended to limit the scope of the invention as claimed in the appended claims.

What is claimed is:

1. A packet memory system comprising:

a memory cell array for storing a predefined number of packets; each packet including a predetermined number of segments; each of said segments for defining a starting point of a read/write memory access;

a packet decoder coupled to said memory cell array and receiving packet select inputs for selecting a packet;

a segment decoder coupled to said memory cell array and receiving segment select inputs for selecting a segment of said selected packet;

a data flow multiplexer coupled to said memory cell array for transferring data between a data bus and said memory cell array for said read/write memory access;

command and mode registers receiving command, read/write (R/W) and chip select (CS) inputs for opening said selected packet for said read/write memory access; and responsive to said selected packet being opened, a read/write segment command being issued for said selected segment of said selected packet for said read/write memory access, and on said packet select inputs a length of said read/write memory access being inputted.

2. A packet memory system as recited in claim 1 wherein each of said segments has a preprogrammed length.

3. A packet memory system as recited in claim 1 wherein each of said segments is defined for a cache line.

4. A packet memory system as recited in claim 1 wherein said memory cell array includes an array of dynamic random access memory (DRAM) cells.

5. A packet memory system as recited in claim 1 wherein said packet has a predetermined total packet length and each of said segments has a preprogrammed length from zero to said total packet length, and where the sum of each of said segments can not be greater than said total packet length.

6. A packet memory system as recited in claim 1 wherein said packet includes four segments and said segment decoder coupled to said memory cell array receives two segment select inputs for selecting one of said four segments.

7. A packet memory system as recited in claim 1 wherein said packet decoder coupled to said memory cell array receives said predefined number of packet select inputs for selecting one of said predefined number of packets.

8. A packet memory system as recited in claim 1 wherein said command inputs include a first command type and a second command type.

9. A packet memory system as recited in claim 8 wherein said first command type includes said open packet command, a close packet command, a refresh command and a self-refresh command.

10. A packet memory system as recited in claim 8 wherein said second command type includes said read/write (R/W) segment command, an open packet command, a close packet command, and a segment stop command.

11. A packet memory system as recited in claim 1 wherein said data flow multiplexer coupled to said memory cell array for transferring data between a data bus and said memory cell array includes a predetermined number of buses, each said bus connected between said data flow multiplexer and a respective one of said predetermined number of segments within said memory cell array.

12. A packet memory system as recited in claim 1 wherein a latency between said memory cell array and said data bus coupled to said data flow multiplexer is less than or equal to one clock cycle.

13. A packet memory system comprising:

a memory cell array including an array of dynamic random access memory (DRAM) cells for storing a predefined number of packets; each packet including a predetermined number of segments; each of said segments having a preprogrammed length; each of said segments for defining a starting point of a read/write memory access;

a packet decoder coupled to said memory cell array and receiving packet select inputs for selecting a packet;

a segment decoder coupled to said memory cell array and receiving segment select inputs for selecting a segment of said selected packet;

a data flow multiplexer coupled to said memory cell array for transferring data between a data bus and said memory cell array for said read/write memory access;

command and mode registers receiving command, read/write (R/W) and chip select (CS) inputs for opening said selected packet for said read/write memory access; and responsive to said selected packet being opened, a read/write segment command being issued for said selected segment of said selected packet for said read/write memory access, and on said packet select inputs a length of said read/write memory access being inputted.

14. A packet memory system as recited in claim 13 wherein each of said segments is defined for a cache line.

15. A packet memory system as recited in claim 13 wherein said packet has a predetermined total packet length and each of said segments has a preprogrammed length from zero to said total packet length, and where the sum of each of said segments can not be greater than said total packet length.

16. A packet memory system as recited in claim 13 wherein said data flow multiplexer coupled to said memory cell array for transferring data between a data bus and said memory cell array includes a predetermined number of buses, each said bus connected between said data flow multiplexer and a respective one of said predetermined number of segments within said memory cell array.

17. A packet memory system as recited in claim 13 wherein a latency between said memory cell array and said data bus coupled to said data flow multiplexer is less than or equal to one clock cycle.

* * * * *